United States Patent
So

(10) Patent No.: US 7,693,330 B2
(45) Date of Patent: *Apr. 6, 2010

(54) ANTI-PIRACY IMAGE DISPLAY METHODS AND SYSTEMS WITH SUB-FRAME INTENSITY COMPENSATION

(76) Inventor: Vincent So, 529 Chapel Street, Ottawa, Ontario (CA) K1N 8A1

(*) Notice: Subject to any disclaimer, the term of this patent is extended or adjusted under 35 U.S.C. 154(b) by 1151 days.

This patent is subject to a terminal disclaimer.

(21) Appl. No.: 11/248,420

(22) Filed: Oct. 13, 2005

(65) Prior Publication Data
US 2006/0029252 A1 Feb. 9, 2006

Related U.S. Application Data

(63) Continuation-in-part of application No. 11/079,222, filed on Mar. 15, 2005.

(60) Provisional application No. 60/552,732, filed on Mar. 15, 2004.

(51) Int. Cl.
G06K 9/00 (2006.01)
G06K 9/34 (2006.01)
G06K 9/76 (2006.01)
G06K 9/40 (2006.01)
H04N 7/167 (2006.01)

(52) U.S. Cl. .................. 382/174; 382/100; 382/210; 382/274; 380/201

(58) Field of Classification Search ........... 382/100, 382/174, 274, 210; 380/201–203
See application file for complete search history.

(56) References Cited

U.S. PATENT DOCUMENTS 5,907,316 A * 5/1999 Mikoshiba et al. .......... 345/596
5,960,081 A * 9/1999 Vynne et al. ................ 713/176
6,024,462 A * 2/2000 Whitehead .................. 362/618
6,044,156 A * 3/2000 Honsinger et al. ............ 380/54
6,057,881 A * 5/2000 Kawashima et al. ........ 348/190

(Continued)

FOREIGN PATENT DOCUMENTS

CA 2368890 10/2000

(Continued)

OTHER PUBLICATIONS

Interlace; Wikipedia, the free encyclopedia, last modified on Aug. 26, 2008, p. 1-4. http://en.wikipedia.org/wiki/Interlace.

*Primary Examiner*—Andrew W Johns
*Assistant Examiner*—Mia M Thomas

(57) ABSTRACT

Image display methods and systems are provided wherein only portions of a still image of a motion picture, generated for display during an image time interval, are displayed during respective sub-intervals of the image time interval. A still image is thereby separated into portions and displayed separately during corresponding sub-intervals. Preferably, no single portion of the image includes all of the content of the entire image. However, the sum of all of the portions preferably includes all of the content of the image, and all of the portions are displayed within the image time interval. Although an image displayed in this manner can be correctly perceived by a viewer, recording of such an image may capture fewer than all of the portions of the image to thereby degrade the quality of recorded copies of the image and thus the motion picture. Intensity compensation is performed such that a consistent brightness is perceived by a user notwithstanding the fact that some portions are displayed for less time.

27 Claims, 11 Drawing Sheets

U.S. PATENT DOCUMENTS

| | | | |
|---|---|---|---|
| 6,167,551 A * | 12/2000 | Nguyen et al. | 714/770 |
| 6,587,084 B1 | 7/2003 | Alymov et al. | |
| 6,725,372 B1 * | 4/2004 | Lewis et al. | 713/176 |
| 6,744,443 B2 | 6/2004 | McKnight et al. | |
| 6,809,792 B1 * | 10/2004 | Tehranchi et al. | 352/85 |
| 6,826,291 B2 * | 11/2004 | Yoshiura et al. | 382/100 |
| 6,909,459 B2 * | 6/2005 | Watson et al. | 348/229.1 |
| 6,953,252 B2 | 10/2005 | Way | |
| 7,006,630 B2 * | 2/2006 | Yu et al. | 380/201 |
| 7,206,409 B2 * | 4/2007 | Antonellis et al. | 380/202 |
| 7,221,759 B2 * | 5/2007 | Nelson | 380/54 |
| 7,227,661 B2 * | 6/2007 | Matsunoshita | 358/1.15 |
| 7,289,644 B2 * | 10/2007 | Duffield et al. | 382/100 |
| 7,292,708 B2 * | 11/2007 | Lee et al. | 382/100 |
| 7,302,162 B2 * | 11/2007 | Beaton | 386/94 |
| 7,369,675 B2 * | 5/2008 | Pelly et al. | 382/100 |
| 7,466,291 B2 * | 12/2008 | Damera-Venkata et al. | 345/32 |
| 7,479,966 B2 * | 1/2009 | Maier et al. | 345/589 |
| 2001/0032315 A1 * | 10/2001 | Van Overveld et al. | 713/176 |
| 2002/0158129 A1 | 10/2002 | Hu | |
| 2003/0058252 A1 * | 3/2003 | Matsuda et al. | 345/589 |
| 2003/0227442 A1 * | 12/2003 | Nishi et al. | 345/156 |
| 2005/0238167 A1 * | 10/2005 | Duffield et al. | 380/203 |
| 2006/0029252 A1 | 2/2006 | So | |
| 2009/0147092 A1 * | 6/2009 | Nakada et al. | 348/217.1 |

FOREIGN PATENT DOCUMENTS

WO    WO 00/62553    4/2000

* cited by examiner

ANTI-PIRACY IMAGE DISPLAY METHODS AND SYSTEMS WITH SUB-FRAME INTENSITY COMPENSATION

RELATED APPLICATION

This application is a continuation-in-part of U.S. application Ser. No. 11/079,222 filed Mar. 15, 2005 and claims the benefit of prior U.S. Provisional Application No. 60/552,732 filed Mar. 15, 2004, hereby incorporated by reference in its entirety.

FIELD OF THE INVENTION

This invention relates generally to image display and, in particular, to anti-piracy image display methods and systems.

BACKGROUND

Movie producers are continually becoming more concerned about movie piracy. In the past year, for example, more than 50 major movies were illegally copied and publicly released even before they came out in theaters, according to the Motion Picture Association of America (M.P.A.A.). The film industry lost a reported US$3.5 billion last year, and estimated losses may rise to US$5.4 billion this year. Illegally copied movies filmed during projection, with video cameras or camcorders and similar devices, are a significant contributing factor to revenue loss. While it may not be possible to completely eliminate theft by copying, it can be advantageous to modify image display and projection techniques so that pirated copies are of such low quality that they are of little or no commercial value.

It is known to provide a distinct symbol or watermark on an original still image as a means of image or copy identification, so as to enable authentication of a copy. As examples, U.S. Pat. No. 5,875,249 (Mintzer et al.), U.S. Pat. No. 6,031,914 (Tewfik et al.), U.S. Pat. No. 5,912,972 (Barton), and U.S. Pat. No. 5,949,885 (Leighton) disclose methods of applying a perceptually invisible watermark to image data as verification of authorship or ownership or as evidence that an image has not been altered. However, while such methods identify and validate image data, they provide no direct means of protection against copying an image, such as using a conventional scanner and color printer.

In contrast, U.S. Pat. No. 5,530,759 (Braudaway et al.) discloses providing a visible, color correct watermark that is generated by altering brightness characteristics but not chromaticity of specific pixels in an image. This approach could be objectionable if used for a motion picture, since the continuing display of a watermark on film could annoy an audience and adversely affect the viewing experience.

The above examples for still-frame images illustrate a key problem: an invisible watermark identifies but does not adversely affect the quality of an illegal copy, while a visible watermark can be distracting and annoying. With video and motion picture images, there can be yet other problems with conventional image watermarking. For example, U.S. Pat. No. 5,960,081 (Vynne et al.) discloses applying a hidden watermark to MPEG data using motion vector data. But this method identifies and authenticates the original compressed data stream and would not provide identification for a motion picture that was copied using a camcorder.

Other patents, such as U.S. Pat. No. 5,809,139 (Girod et al.), U.S. Pat. No. 6,069,914 (Cox), and U.S. Pat. No. 6,037,984 (Isnardi et al.) disclose adding an imperceptible watermark directly to the discrete cosine transform (DCT) coefficients of a MPEG-compressed video signal. If such watermarked images are subsequently recompressed using a lossy compression method (such as by a camcorder, for example) or are modified by some other image processing operation, the watermark may no longer be detectable.

These particular invisible watermarking schemes add a watermark directly to the compressed bit stream of an image or image sequence. Alternatively, there are other watermarking schemes that add the watermark to the image data itself, rather than to the compressed data representation. An example of such a scheme is given in U.S. Pat. No. 6,044,156 (Honsinger et al.), which discloses a spread spectrum technique using a random phase carrier.

However, regardless of the specific method that is used to embed a watermark, there is always a concern that a watermarking method might not be robust, that is, able to withstand various "attacks" that can remove or alter the watermark. Some attacks may be deliberately aimed at the underlying structure of a given watermarking scheme and require detailed knowledge of watermarking techniques applied, although most attack methods are less sophisticated, performing common modifications to the image such as using lossy compression, introducing lowpass filtering, or cropping the image, for example. Such modifications can be made when a video camera is used to capture a displayed motion picture. These methods present a constant threat that a watermark may be removed during the recording process.

The watermarking schemes noted above are directed to copy identification, ownership, or authentication. However, even if a watermarking approach is robust, provides copy control management, and succeeds in identifying the source of a motion picture, an invisible watermark may not be a sufficient deterrent for illegal copying.

As an alternative to watermarking, some copy deterrent schemes used in arts other than video or movie display operate by modifying a signal or inserting a different signal to degrade the quality of any illegal copies. The modified or inserted signal does not affect playback of a legally obtained manufactured copy, but adversely impacts the quality of an illegally produced copy. As one example, U.S. Pat. No. 5,883,959 (Kori) discloses deliberate modification of a burst signal to foil copying of a video. Similarly, U.S. Pat. No. 6,041,158 (Sato) and U.S. Pat. No. 5,663,927 (Ryan) disclose modification of expected video signals in order to degrade the quality of an illegal copy. As yet another example of this principle, U.S. Pat. No. 4,644,422 (Bedini) discloses adding a degrading signal to discourage copying of audio recordings. An audio signal having a frequency at and above the high threshold frequency range for human hearing is selectively inserted into a recording. The inserted signal is not detectable to the listener. However, any unauthorized attempt to copy the recording onto tape obtains a degraded copy, since the inserted audio signal interacts adversely with the bias oscillator frequency of a tape recording head.

The above-mentioned copy protection schemes deliberately inject a signal in order to degrade the quality of a copy. While such methods may be effective for copy protection of data from a tape or optical storage medium, these methods do not discourage copying of a motion picture image using a video camera.

As a variation of the general method where a signal is inserted that does not impact viewability but degrades copy quality, U.S. Pat. No. 6,018,374 (Wrobleski) discloses the use of a second projector in video and motion picture presentation. This second projector is used to project an infrared (IR) message onto the display screen, where the infrared message can contain, for example, a date/time stamp, theater identifying text, or other information. The infrared message is not visible to the human eye. However, because a video camera has broader spectral sensitivity that includes the IR range, the message will be clearly visible in any video camera copy made from the display screen. The same technique can be used to distort a recorded image with an "overlaid" infrared image. While the method disclosed in U.S. Pat. No. 6,018,374 can be effective for frustrating casual camcorder recording, the method has some drawbacks. A more sophisticated video camera operator could minimize the effect of a projected infrared watermark using a filter designed to block infrared light. Video cameras are normally provided with some amount of IR filtering to compensate for silicon sensitivity to IR.

Motion picture display and video recording standards have well-known frame-to-frame refresh rates. In standard motion picture projection, for example, each film frame is typically displayed for a time duration of $1/24^{th}$ of a second. Respective refresh rates for interlaced NTSC and PAL video recording standards are $1/60^{th}$ of a second and $1/50^{th}$ of a second. Video camera capabilities such as variable shutter speeds allow close synchronization of a video camera with film projection, making it easier for illegal copies to be filmed within a theater. Attempts to degrade the quality of such a copy include that disclosed in U.S. Pat. No. 5,680,454 (Mead) and U.S. Pat. No. 6,529,600 (Epstein), which disclose use of a pseudo-random variation in frame rate, causing successive motion picture frames to be displayed at slightly different rates than nominal. Using this method, for example, frame display periods would randomly change between $1/23^{rd}$ and $1/25^{th}$ of a second for a nominal $1/24^{th}$ second display period. Timing shifts within this range would be imperceptible to the human viewer, but significantly degrade the quality of any copy filmed using a video camera. The randomization proposed therein would prevent resynchronization of a video camera to a changed display frequency. While these methods may degrade the image quality of a copy made by video camera, they also have limitations. As noted in the disclosure of U.S. Pat. No. 5,680,454, the range of frame rate variability is constrained, since the overall frame rate must track reasonably closely with accompanying audio. Furthermore, a video camera can easily be modified to so that its frame rate tracks with the motion picture.

U.S. Pat. No. 5,959,717 (Chaum) also discloses a method and apparatus for copy prevention of a displayed motion picture work. The apparatus of U.S. Pat. No. 5,959,717 includes a film projector along with a separate video projector. The video projector can be used, for example, to display an identifying or cautionary message or an obscuring pattern that is imperceptible to human viewers but can be recorded using a video camera. Alternately, the video camera may even display part of the motion picture content itself. By controlling the timing of the video projector relative to film projector timing, a message or pattern can be made that will be recorded when using a video camera, but will be imperceptible to a viewing audience. This method, however, requires distribution of a motion picture in multiple parts, which greatly complicates film replication and distribution. Separate projectors are also required for the film-based and video-based image components, adding cost and complexity to the system and to its operation. Image quality, particularly for large-screen environments, may not be optimal for video projection, and alignment of both projectors to each other and to the display surface must be precisely maintained.

U.S. Published patent application No. 2002/0168069 describes an apparatus and method for displaying a copy-deterrent pattern within a digital motion picture in order to discourage recording of the motion picture using a video camera or other sampling recording device. The copy-deterrent pattern comprises a plurality of pixels within each frame of the digital motion picture, and the displayed pixel intensities are modulated at a temporal frequency using modulation characteristics deliberately selected to be imperceptible to human observers while simultaneously producing objectionable aliasing in any copy made using a video camera. There are drawbacks in this approach. During recording using a video camera the camera shutter can be set to open long enough to average out the modulation. For example, in the example shown in FIG. 12 of the reference, the frame rate is 24 frames per second, and the modulation is at 96 Hz. If the camera shutter speed is set at $1/48$ sec, then there will be no or minimal alias effect. Furthermore, if sampling rate is fast enough (e.g. 96 Hz) then all the information will be recorded in the pirate copy and the modulation in pixel intensities can be removed by digital signal processing.

U.S. published application No. 2004/0033060 describes a method of modulation of a video signal with an impairment signal to increase the video signal masked threshold. With this arrangement, an impairment signal is applied to a version of the movie having a higher frame rate than normal. The impairment signal is designed to produce an apparent motion across the frame when applied at a high frame rate and less rapid apparent motion when viewed at a lower frame rate. When a person views the high frame rate movie, the brain is capable of summing rapid frames such that the impairment is not visible. When a lower frame rate video camera records such a signal, it will not capture all of the images, but rather only particular ones and as such the summing of successive images to produce the proper result will not be achieved. However, with recent improvements in CCD technology, the exposure period possible with video recorders is much longer. Where previously a 60 frame per second camera would have an exposure time that was much less than $1/60^{th}$ of a second, new technologies allow exposures approaching the full $1/60^{th}$ of a second duration. In such a case, the video camera would be able to perform an integration to sum successive rapid frames such that the slower frames are substantially correct.

Conventional methods such as those described above could be adapted to provide some measure of copy deterrence and watermarking for digital motion pictures. However, none of the methods noted above is wholly satisfactory, for the reasons stated.

SUMMARY OF THE INVENTION

According to one broad aspect, the invention provides a method comprising: for each of a plurality of still images of a motion picture: rendering a respective sequence of sub-frames such that each sub-frame comprises the still image with one or more portions omitted, with every portion of the still image being included in at least one sub-frame; applying intensity compensation such that when the sequence of sub-frames is displayed, an image substantially equivalent to the still image is perceptable.

In some embodiments, the method further comprises: processing each still image to determine portions that have a low intensity; wherein the portions that are omitted in rendering the sequence of sub-frames are selected from the portions determined to have low intensity.

In some embodiments, processing each still image to determine portions that have a low intensity comprises: determining portions that have an intensity less than or equal to 1/N times a maximum intensity, where N is the number of sub-frames in the sequence of sub-frames.

In some embodiments, applying intensity compensation such that when the sequence of sub-frames is displayed, an image substantially equivalent to the still image is perceptable comprises: rendering a film with one still image per processed still image in which portions that are to be omitted are brighter on the film; storing information identifying the portions of the film that are brighter; during projection, applying sub-framing using the stored information.

In some embodiments, rendering and applying intensity compensation comprises: storing one digital image per sub-frame; increasing intensity of stored pixels that are omitted in at least one sub-frame.

In some embodiments, applying intensity compensation and rendering comprises: storing one digital image per still image in which pixels of the portions to be omitted have increased intensity, and storing information identifying the portions that have increased intensity; during projection, applying sub-framing using the stored information.

In some embodiments, processing the image to determine portions that are less bright comprises: determining a maximum brightness of each of a set of possible portions to be omitted; selecting portions having a maximum brightness less than a threshold.

In some embodiments, determining a maximum brightness of each of a set of possible portions to be omitted comprises: determining a maximum Y value for each of the possible portions to be omitted.

In some embodiments, the method further comprises computing a Y value for each pixel from RGB coding.

In some embodiments, rendering the sub-frames comprises displaying the sub-frames.

In some embodiments, rendering comprises recording.

In some embodiments, the plurality of sub-frames of the still image comprises N sub-frames, wherein N is a positive integer greater than 1, and wherein each sub-frame is displayed for sub-intervals that is approximately a fraction 1/Nth of an image time interval, and wherein portions that are omitted in all but one sub-frame have their intensity increased by a factor of $N^{1/\gamma}$, where γ is a power relationship between an encoded luminance (Y) of the portion and an actual desired image brightness (I) by $$I=Y^\gamma$$

In some embodiments, the method further comprises generating each still image in a motion picture projector for projection onto a screen; wherein rendering comprises filtering the generated still image to allow the plurality of portions of the generated still image to pass to the screen during respective sub-intervals.

In some embodiments, the method further comprises: projecting each still image onto a mirror; wherein rendering comprises reflecting the plurality of portions of the still image from the mirror to a screen during respective sub-intervals.

In some embodiments, rendering comprises illuminating a mirror in a digital motion picture projector.

In some embodiments, displaying comprises: providing an LCD (liquid crystal display) covering at least a portion of the mirror; and controlling the liquid crystal display to position liquid crystals of the LCD to allow the portions of the generated still image to pass through the LCD during respective sub-intervals.

In some embodiments, rendering comprises filtering each still image to display the plurality of portions of the still image during the respective sub-intervals.

Other aspects and features of embodiments of the present invention will become apparent to those ordinarily skilled in the art upon review of the following description of specific embodiments of the invention.

BRIEF DESCRIPTION OF THE DRAWINGS

Examples of embodiments of the invention will now be described in greater detail with reference to the accompanying diagrams, in which.

DETAILED DESCRIPTION OF PREFERRED EMBODIMENTS

Figure 1A:
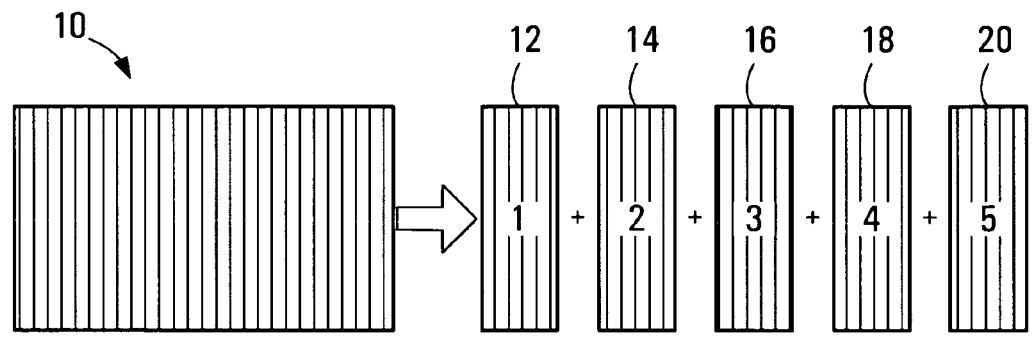
FIG. 1 is a representation of a set of sub-frames.

Embodiments of the invention generally relate to methods and systems for displaying portions of a still image instead of a complete still image, such as a set of sub-frames instead of a standard frame in a motion picture. Each sub-frame does not have all the information of the frame, but the set of sub-frames preferably contains the same information as the frame. To an audience viewing a motion picture displayed in this manner, there is no visible difference, but for a video capture device such as video camera, there will be information missing if not all the sub-frames are captured.

If a still image is divided into a collection of small colored dots, then the human brain is able to effectively reassemble the dots into a meaningful image. Similarly, if a moving scene is divided into a sequence of still images which are shown in rapid succession, then the brain reassembles the still images into a single moving scene.

Movies work because of persistence of vision. The human eye generally retains an image for about $\frac{1}{20}^{th}$ of a second after seeing it. Such persistence of vision creates the illusion of motion from still images. This phenomenon, however, is not exhibited to the same extent in recording devices such as a video camera. For example, when a video camera records a moving scene from a TV or computer monitor, there tends to be pronounced flicker and often a black rolling bar in the recorded image instead of the stable image that eyes see.

This flicker is caused by two characteristics, namely a difference in the scanning frequency between the TV or monitor and the camera, and a difference between the way in which phosphor dots are perceived by the human eye and the camera's image sensor. In a standard CRT display, a single electron beam scans horizontal lines of pixels across the screen, lighting up each pixel when the beam hits it. The pixels are made of individual phosphor dots that glow when the beam hits them. In human eyes, the dots glow for about $1/30^{th}$ of a second, so we see a steady image. For a video camera, however, the dots do not appear to glow nearly as long. The camera is much less persistent than the eye.

With monitor refreshing every $1/60^{th}$ of a second and a camera taking a frame every $1/60^{th}$ of a second, for example, the video camera's lower persistence results in low quality recording. The black bar that is observed when the recorded video is played back is essentially a collection of pixels that had faded by the time the camera tried to image them. The bar rolls because the camera and monitor are not exactly synchronized, even though the frame rates may be nominally the same.

In projecting a movie from film for instance, each frame is exposed for a short time and then advanced to the next frame. Normally, the film is advanced at the rate of 24 frames per second.

If a regular repeating pattern of sub-frames is used, it is possible that a video capture device with a long enough exposure time will be able to capture all of the sub-frames. For example, referring to FIG. 1, suppose each original image frame 10 is sub-divided into five sub-frames 12,14,16,18,20 according to a repeating pattern with each sub-frame having portions of the original image blocked out as shown. The sum of the five images 12,14,16,18,20 adds up to the original frame 10.

Figure 1B:
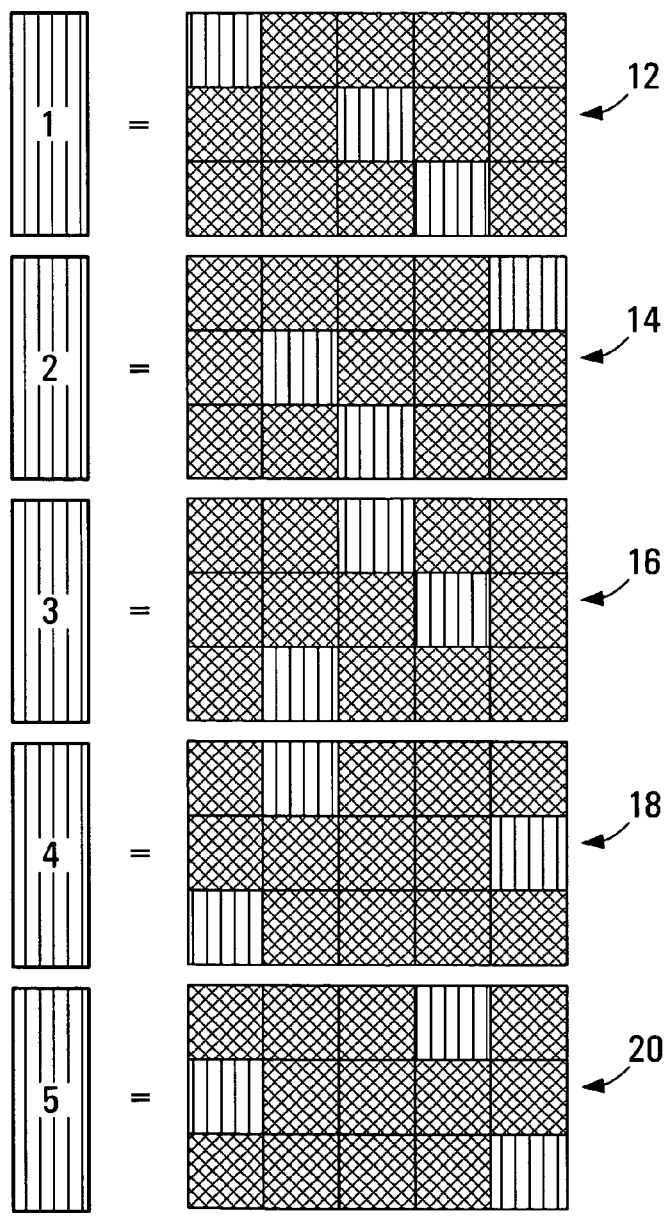
Figure 2:
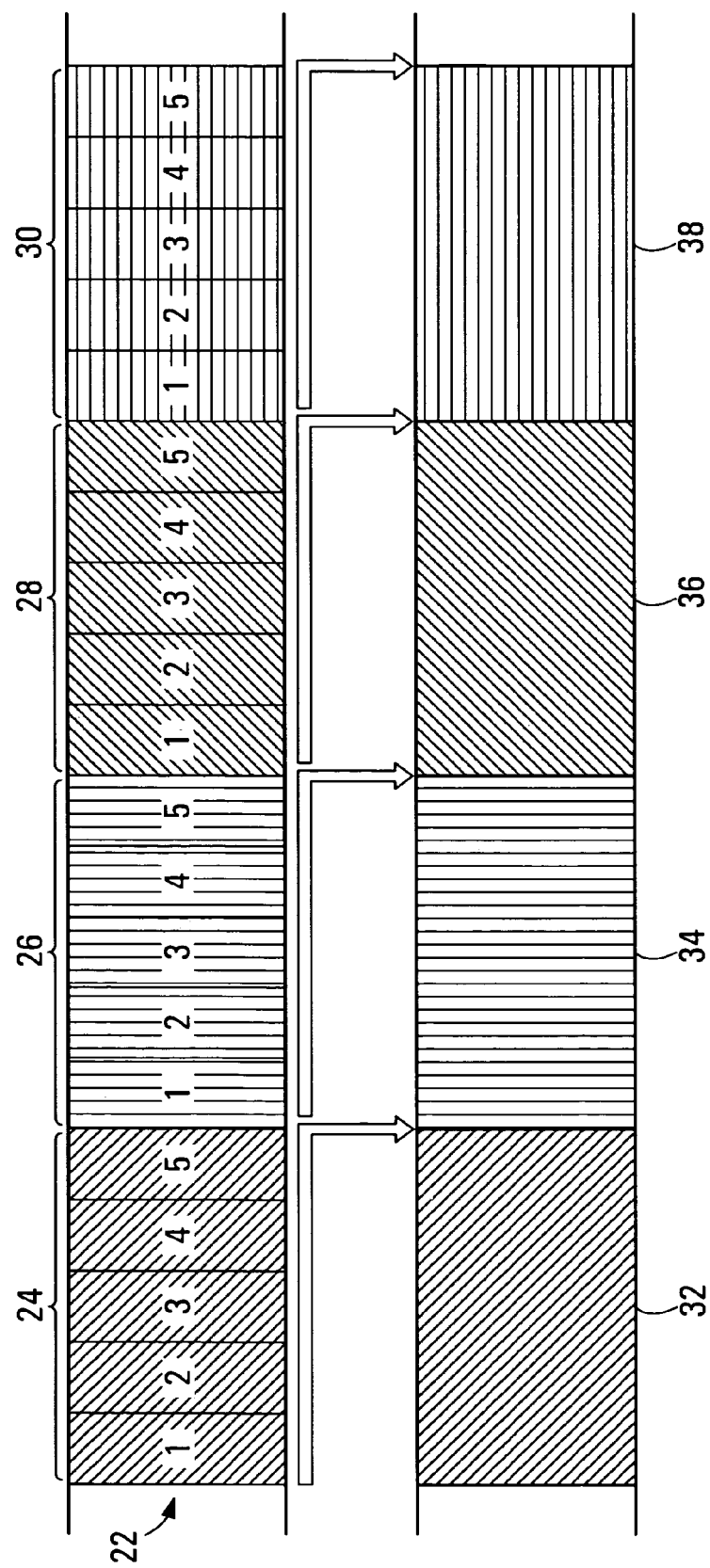
FIG. 2 shows the effect of using the set of sub-frames of FIG. 1.

Now referring to FIG. 2, when a sequence of sub-frames generally indicated at 22 is displayed, with sets 24,26,28,30 of five sub-frames shown for each of four different frames, sub-frames 24 are perceived as the original image 32, sub-frames 26 are perceived as image 34, sub-frames 28 are perceived as image 36 and sub-frames 30 are perceived as original image 38. That is to say the fact that the sub-frames 22 are played at a rapid pace allows the brain to add consecutive sub-frames sub-consciously to produce the original images. Thus, the fact that the images have been transformed into the sub-frames with blocked out portions as shown in FIG. 1 does not result in a perceptable degradation in the picture quality.

Figure 3:
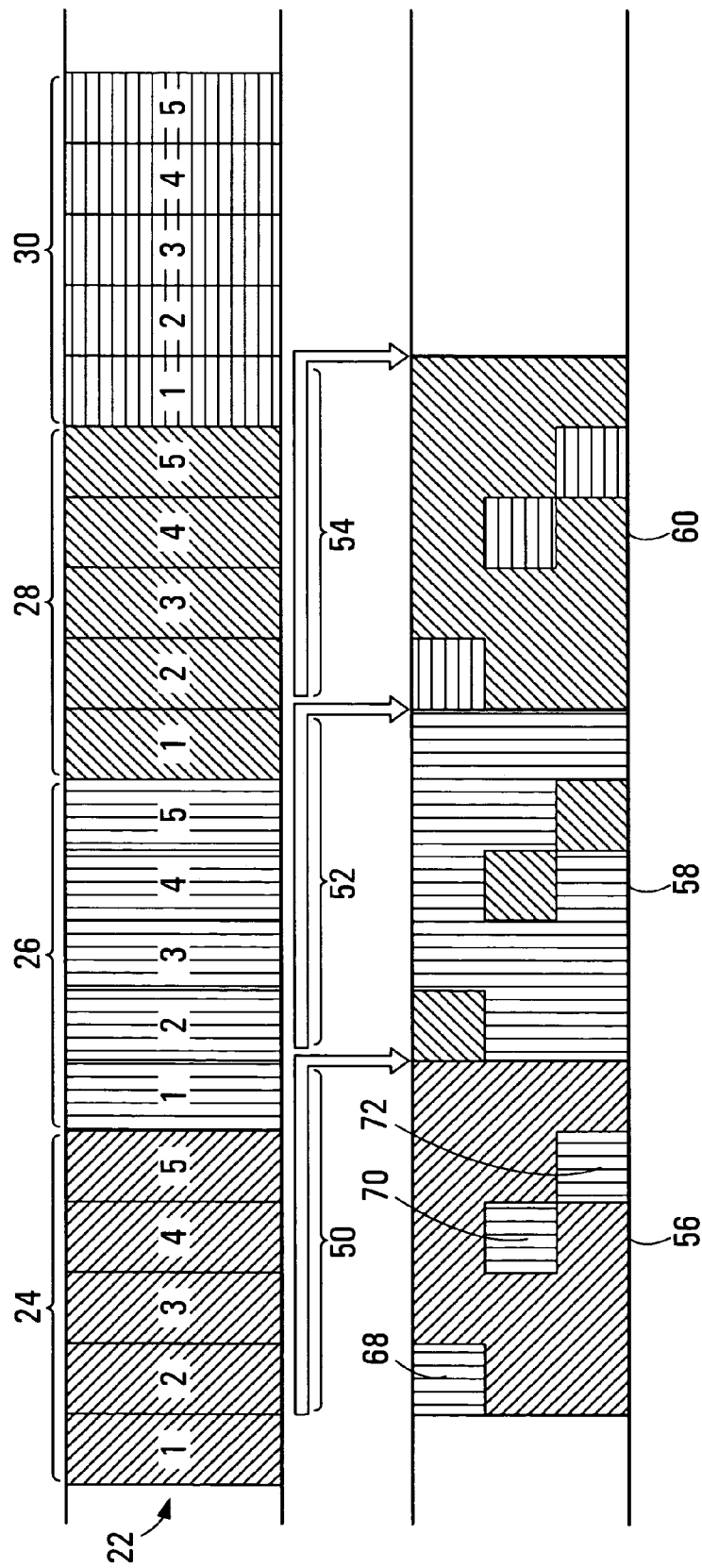
FIG. 3 shows the effect of recording the pattern of FIG. 2 with a frame synchronization offset by one sub-frame.

Disadvantageously, with the sub-frame format of FIG. 1, if a video capture device is successfully synchronized with the first sub-frame of each frame, and has an exposure time long enough to capture all five frames of each image, then no picture degradation will result in the recorded video. Furthermore, in the event the video camera is capable of synchronizing not to the first sub-frame of each original image, but to one of the other sub-frames, for example each second sub-frame, there still would not be significant degradation. This is shown in FIG. 3 where the exposure intervals are indicated at 50,52,54. Now it can be seen that during exposure interval 50, the second, third, fourth and fifth sub-frames of original image 24 and the first sub-frame of image 26 are summed and recorded. During exposure interval 52, the second, third, fourth and fifth sub-frames of original image 26 and the first sub-frame of image 28 are summed and recorded, and during exposure interval 54, the second, third, fourth and fifth sub-frames of original image 28 and the first sub-frame of original image 30 are summed and recorded. The resulting sum is indicated at 56,58,60 for the three exposure periods. For each exposure period, four of the sub-frames are accurately recorded, but the fifth sub-frame is from the following image. However, because consecutively images generally do not differ by that much, the fact that a portion of the image is taken from a following image in a repeating manner will not significantly degrade the perception of the movie. In particular, it can be seen that the resulting recorded image for the first frame 24 contains three blocks 68,70,72 (corresponding to the blocks of the first sub-frame 12 of FIG. 1) for the succeeding frame 26 with a remainder of the image taken from the current image 24. So long as the two images are not significantly different, this will not create a significant perceptable degradation in the image quality. Thus, the entire effort of degrading the image does not achieve the desired result of deterring video piracy.

Figure 4:
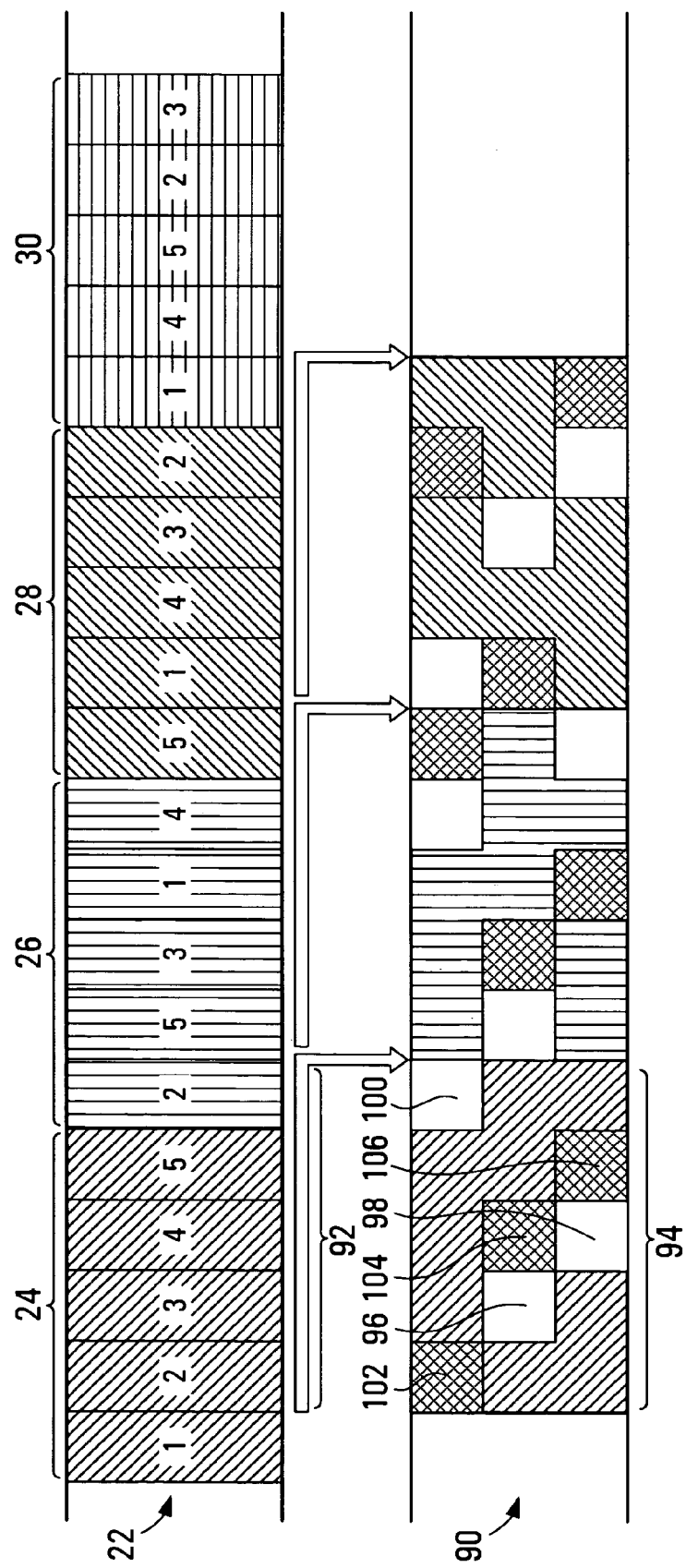
FIG. 4 is an example of sub-frame sequencing provided by an embodiment of the invention.

Referring now to FIG. 4, in an effort to deal with this, an element of variation is introduced into the sub-frame sequencing. This will be described with the specific example of FIG. 4 with more general concepts introduced later. In this case, there are again four sets of five sub-frames 80,82,84,86. Each of these sub-frames contains a respective portion of an original image. For the purpose of this example, it is assumed that the sub-frames are produced using the sub-frame patterns shown in FIG. 1. However, in this case, the sequence of sub-frames for each frame is not repeating. Rather, there is a variation in the order of the sub-frames between adjacent images. For the first image 80, the sequence of sub-frames is 1,2,3,4,5. For the next image 82, the sequence is 2,5,3,1,4. For the next image, 84, the sequence is 5,1,4,3,2. Finally, for the next image 86, the sequence is 1,4,5,2,3. The effect of this upon a video recording of such a sequence of sub-frames can be seen at 90. In this case, it is assumed that the video recording device is capable of synchronizing on the second sub-frame of each frame. This means that during the first exposure interval 92, sub-frames 2,3,4,5 of the first image 80 and sub-frame 2 of the second image 82 are summed to produce image 94. It can be seen that such a sum has gaps in the image indicated at 96,98,100 due to the fact that the sum does not include sub-frame 1 from either the current image 80 or from a following image 82. Furthermore, there is also degradation in the areas indicated at 102,104,106 where the contribution of the second sub-frame of each of two successive frames 80,82 has been summed resulting in distortion. It can be seen that the randomness introduced in the sub-frame order results in the degradation in each frame with the degradation being different in successive frames.

In some embodiments, the fast response of advanced LCDs (liquid crystal displays) and DLPs (digital light processors) is exploited to display a number of sub-frames instead of a standard frame in a motion picture within a standard frame period of $1/24^{th}$ of a second, which may be referred to more generally as an image time interval.

Figure 5:
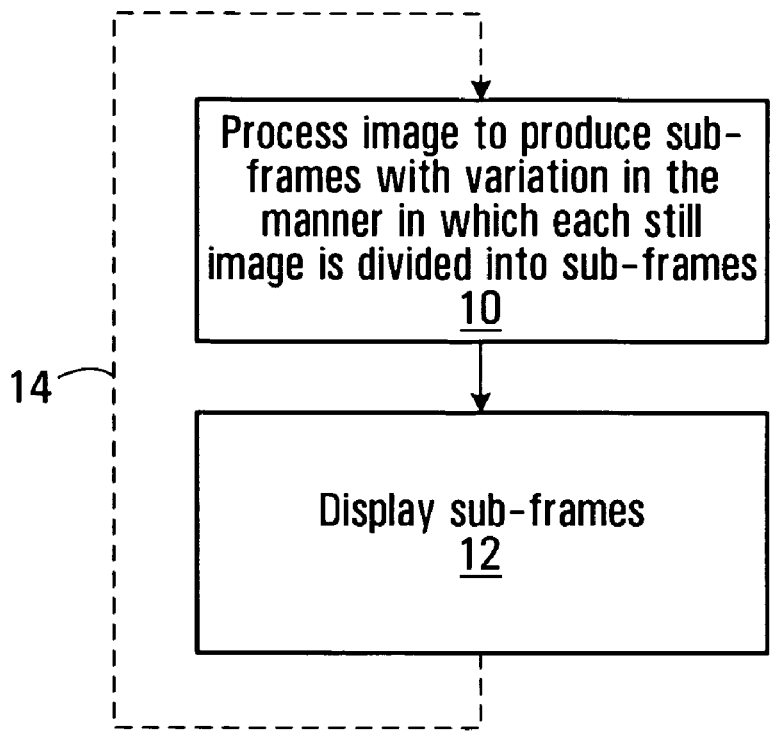
FIG. 5 is a flow diagram illustrating a method according to an embodiment of the invention.

FIG. 5 is a flow diagram illustrating a method according to an embodiment of the invention. At 10, one of a number of still images of a motion picture is processed for display during an image time interval, illustratively the frame duration described above to produce sub-frames with variation in the manner in which still images are divided into sub-frames. Examples of this variation include, but are not limited to: a) variation in the number of sub-frames per image interval; b) variation in the impairment pattern applied to successive sub-frames (specific example given in FIG. 4); c) variation in the duration of the sub-frames per image interval. Portions of the generated still image are then displayed at 12 during respective sub-intervals of the image time interval. Thus, in each sub-interval, only a portion of the generated still image is displayed. As indicated at 14, these operations are repeated for each still image in the motion picture.

Generally, an image is separated into n portions, and each of the sub-intervals is preferably approximately a fraction 1/nth of the image time interval, where n is a positive integer greater than one. However, it should be appreciated that the portions need not be of equal size, and that the sub-intervals may also be of different lengths.

In another embodiment, the sub-frames of a given image interval on average are displayed during a period equal to the image interval, but with a small variation in the period used for successive images. This type of variation will not be perceptable to a user, but will further degrade the ability of a video capture device to synchronize to a frame or sub-frame rate.

In one embodiment, a sequence of impairment masks is applied to each image to produce a set of sub-frames for each interval with the order of the resulting sub-frames being randomized between successive image intervals.

The order does not need to be truly random. Rather, there needs to be some variation between at least some, and preferably all, consecutive image intervals to achieve the desired effect.

In one embodiment, the still image is generated in a projector for projection onto a screen. The operation at 12 in such embodiments may include filtering the generated still image to allow the portions of the generated still image to pass to the screen one at a time during the sub-intervals. This filtering may be accomplished, for example, by providing an apertured filter component and moving the apertured filter component to position apertures such that only a portion of the generated still image is allowed to pass to the screen during each of the sub-intervals. Such a filter component may be provided either within the projector or as an external component, such as in an accessory for the projector, and is preferably but not necessarily synchronized with the projector, such as once per image time interval. For a film projector, for example, movement of a filter component is preferably synchronized with the frame rate. Illustrative examples of a filter component are described in further detail below.

According to other embodiments of the invention, a projector projects generated still images onto a mirror, which may be internal or external to the projector. Portions of the still images are then reflected from the mirror to a screen during respective sub-intervals of an image time interval. Control of the portions that are reflected to the screen during any sub-interval may be provided by an LCD covering at least a portion of the mirror. Liquid crystals of the LCD are then positioned to allow the portions of the still image to pass through the LCD during the respective sub-intervals. In another embodiment, the mirror includes multiple mirrors with controllable angles, in a DMD (digital micromirror device) for instance. Each mirror is positioned at a particular angle during each sub-interval to reflect a portion of the generated still image to the screen.

Each image time interval preferably has substantially the same duration. Similarly, each sub-interval of an image time interval also preferably has substantially the same duration, which is less than the image time interval. However, it should be appreciated that the invention is in no way limited thereto. Embodiments of the invention may be used in conjunction with variable frame rate projectors, with synchronization at the beginning of each image time interval or frame for example, and may display portions of an image for different amounts of time.

Figure 6:
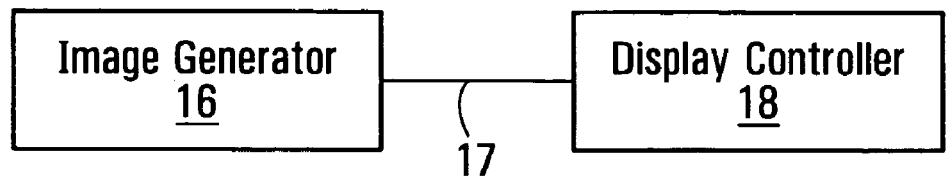
FIG. 6 is a block diagram of a system according to an embodiment of the invention.

FIG. 6 is a block diagram of a system according to an embodiment of the invention. The system includes an image generator 16 operatively coupled to a display controller 18 via a connection 17. Of course, a motion picture display or projection system may include further elements than those explicitly shown in FIG. 6.

The image generator 16 generates still images of a motion picture for display during respective image time intervals. In a preferred embodiment, the image generator 16 is a motion picture projector such as a film projector which illuminates motion picture film or a digital projector. One example of a digital projector is described in further detail below with reference to FIG. 7.

Although shown and referred to as a connection, the connection 17 should be understood to include a physical connection, an optical connection with or without an actual physical carrier connected between the image generator 16 and the display controller 18, or possibly combinations thereof or a logical connection. For example, a physical connection may be provided to enable synchronization between the image generator 16 and the display controller 18, whereas still images generated by the image generator 16 are provided to the display controller 18 through an optical "line-of-sight" path.

The display controller 18 displays portions of each still image generated by the image generator 16 during respective sub-intervals of the image time interval in which the still image is generated. Thus, the display controller 18 effectively separates generated still images into portions for display in corresponding sub-intervals. The display controller 18 may be implemented in a projector which also incorporates the image generator 16, or as an external accessory for such a projector.

Figure 7:
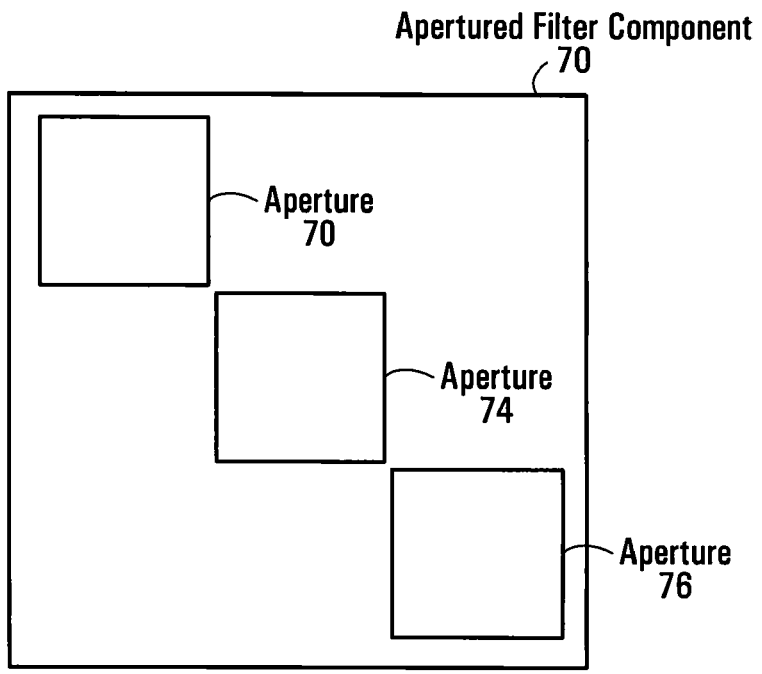
FIG. 7 is an embodiment of an apertured filter component.

In one embodiment, the display controller 18 includes a filter for filtering each generated still image. Portions of each generated still image are thus passed, to a projection screen for example, during respective sub-intervals. Such a filter may include an apertured filter component, an illustrative example of which is shown in FIG. 7. Apertured filter component 70 includes apertures 72,74,76 that define one portion or sub-frame. The portion consists of three square areas 72,74,76. Further filters would be defined for the other sub-frames. The filters are applied in sequence to the still image. The filters might for example be implemented with a transparent liquid crystal display. Alternatively, motion between a series of different physically distinct filters may be used. Those skilled in the art will appreciate that different numbers, shapes, and sizes of apertures and filter components than those specifically shown may be used for display control in accordance with the techniques disclosed herein. The size of the aperture or apertures determines the number of portions into which an image is separated.

Other forms of filter components will be apparent to those skilled in the art to which this application pertains. It should thus be appreciated that the invention is in no way limited to the filter component 70.

Where physically distinct components are provided, the display controller 18 moves the filter components during each image time interval to position any apertures to pass or transmit portions of a generated still image during respective sub-intervals. As will be apparent, the filter components may be moved through control of a motor, linkage, or other device (not shown) for moving the filter component.

According to further embodiments of the invention, the image generator 16 projects an image onto a mirror, which reflects the image onto a screen. In one embodiment, an LCD covers at least a portion of the mirror, and the display controller 18 controls the LCD to position liquid crystals of the LCD so as to allow portions of the image to pass through the LCD to the screen during respective sub-intervals an image time interval. It should also be appreciated that an LCD may be used in a similar manner on its own as a filter component as discussed above.

The mirror includes multiple mirrors in another embodiment of the invention, and the display controller 18 controls an angle of each mirror to reflect portions of the image to the screen during the respective sub-intervals.

Figure 8:
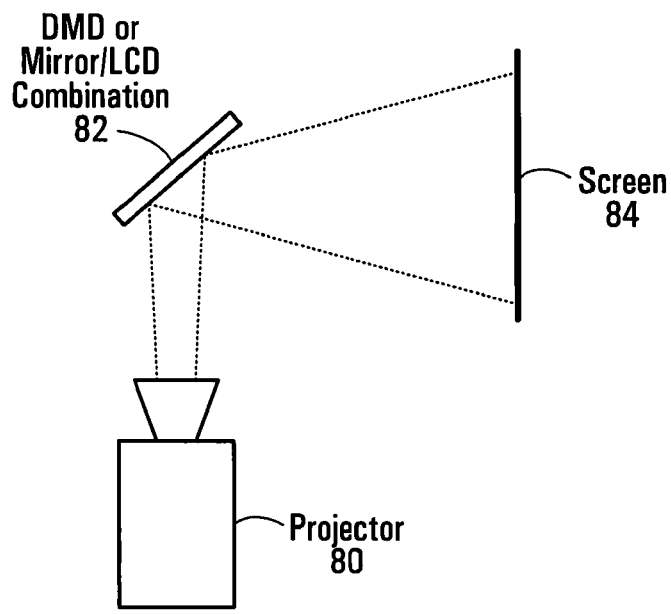
FIG. 8 is a block diagram of a system according to an embodiment of the invention.

FIG. 8 is a block diagram of a system incorporating an embodiment of the invention. In the system of FIG. 8, a DMD or mirror/LCD combination 82 is provided externally to a projector 80, and reflects portions of images generated by the projector 80 onto the screen 84. This type of system is particularly adapted to projectors which do not incorporate a mirror, such as film projectors, for example.

Figure 9:
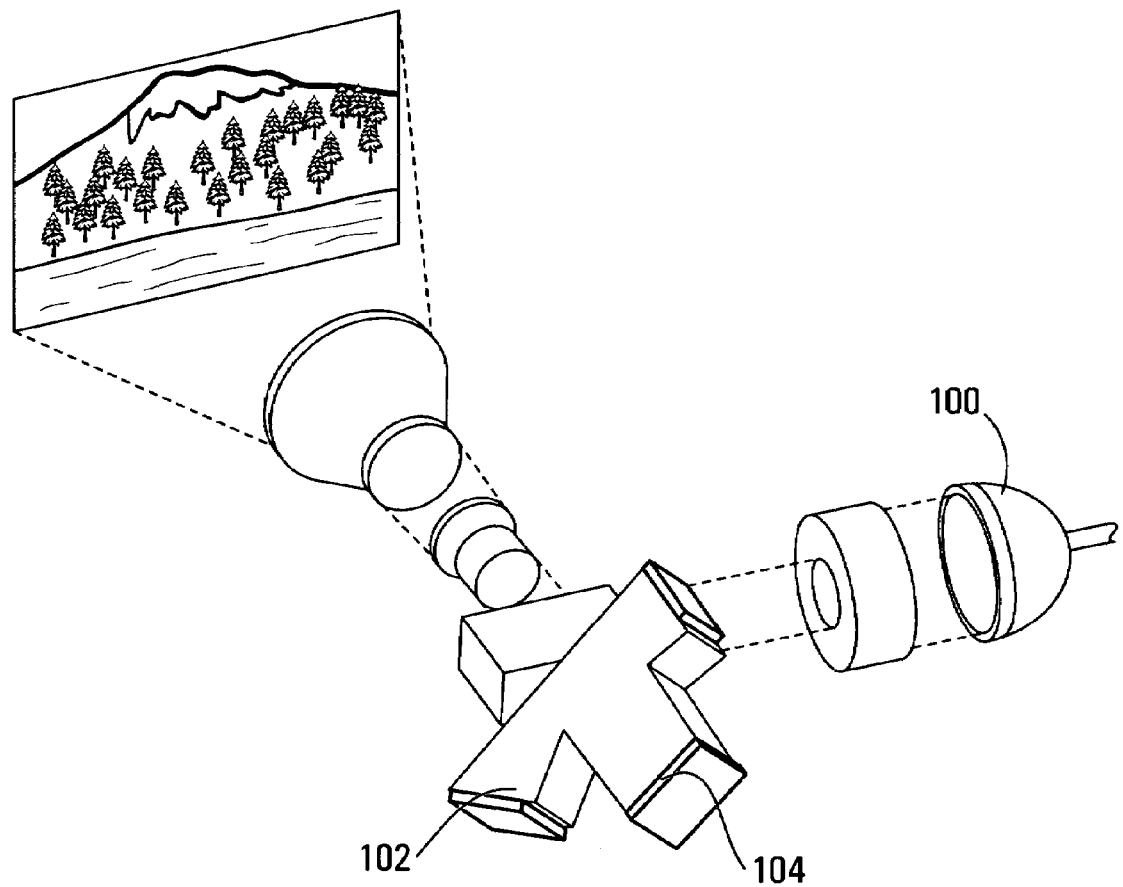
FIG. 9 is a block diagram of a digital projector in which embodiments of the invention may be implemented.

As will be apparent from FIG. 8, an image separator, which includes a mirror in the example system of FIG. 8 but may instead include a filter component or other type of separator, may be provided externally to a projector. However, digital projectors incorporate such mirrors. FIG. 9 is a block diagram of a digital projector in which embodiments of the invention may be implemented.

There are currently two major digital cinema projector technologies: micromirror projectors and LCD projectors. Micromirror projectors form images with an array of microscopic mirrors. In this type of system as shown in FIG. 9, a high-power lamp 100 shines light through a prism 102. The prism 102 splits the light into the component colors red, green and blue. Each color beam hits a different DMD 104, which is a semiconductor chip that is covered in hinged mirrors, often more than a million hinged mirrors. Based on information encoded in a video signal, the DMD turns over the tiny mirrors to reflect the colored light. Collectively, the tiny dots of reflected light form a monochromatic image.

In actuality, most of the individual mirrors are flipped from "on" (reflecting light) to "off" (not reflecting light, or reflecting light to a location outside an area of a projection screen) and back again thousands of times per second. A mirror that is flipped on a greater proportion of the time will reflect more light and so will form a brighter pixel than a mirror that is not flipped on for as long. This is how the DMD creates a gradation between light and dark. The mirrors that are flipping rapidly from on to off create varying shades of gray (or varying shades of red, green and blue, in this case). Each micromirror chip reflects the monochromatic image back to the prism, which recombines the colors. The red, green and blue rejoin to form a full color image, which is projected onto a screen.

LCD projectors reflect high-intensity light off of a stationary mirror covered with an LCD. Based on a digital video signal, the projector directs some of the liquid crystals to let reflected light through and others to block it. In this way, the LCD modifies the high-intensity light beam to create an image.

Since signal information is already encoded in digital format for digital projectors, and each micromirror (in micromirror technology) or pixel (in LCD technology) is independently addressable, embodiments of the invention can be easily incorporated into digital projectors.

According to a further embodiment of the invention, portions of a still image or frame of a motion picture, the still image or frame having an associated image or frame rate, are generated. The portions of the still image or frame are then displayed during respective sub-image or frame time intervals at a sub-image or sub-frame rate which is greater than the image or frame rate. Where there are n portions (n a positive integer greater than one), the sub-image or sub-frame rate is preferably n times the image or frame rate.

Such an embodiment of the invention may be implemented, for example, by recording the portions of the image or frame on a recording medium and then operating a projector at the sub-image or sub-frame rate instead of the image or frame rate. The recording medium may be motion picture film or a digital recording medium such as a DVD (digital video disk) for instance.

In another embodiment, the manner in which the sub-frames is generated can be changed in real time locally and/or remotely.

For example, although described primarily in the context of separating an entire image into separately displayed portions, the techniques described herein may alternatively be applied to only a particular section of an image, with other sections of the image being displayed during an entire image time interval. In this case, illumination strengths are preferably controlled to avoid any perceptible differences in intensity between the sections of the image.

In the embodiments described, the sub-frames are generated by first generating the still image and then applying a sequence of impairments to generate these sub-frames. More generally, any method of rendering the sub-frames may be employed. For example, the film may be produced to have a higher frame rate in which these sub-frames are present. It may be that the entire image is never actually generated, but rather the sequence of sub-frames alone is generated. The rendered images may in some embodiments be projected or otherwise displayed. Alternatively, the rendered images may be recorded for later display. This recording can take place in any suitable recording medium.

Preferably, the variation in the manner in which the portions of the still image are generated is selected such that a gap left in a first still image due to the omission of a first sub-frame of the sequence of sub-frames for that still image is not filled by a first sub-frame of the next still image. Preferably, this variation is present for multiple pairs of consecutive images and in some embodiments for all pairs of consecutive images.

In some embodiments, the portion shapes used for rendering the sub-frames of each still image are the same. In such an embodiment, the variation in the manner in which the respective portions are generated is achieved by rendering the sequences of sub-frames to have a variation in the order of the set of portion shapes among the pairs of consecutive still images. For example, if five different portion shapes are used such as was the case in the example of FIG. 4, the desired effect can be achieved by employing a different order among the portion shapes for the sub-frames of consecutive images.

In another embodiment, there is no relationship between the sub-frames, this not being the case for the "picket fence" approach taught in above-referenced application No. 2004/0033060.

In another embodiment, there is randomness or pseudo-randomness in the sequences of sub-frames.

In addition, enhanced control of image separation and illumination intensity may be provided to implement variable separation schemes, wherein a number of image portions and sub-intervals are varied during projection of a motion picture.

Sub-Frame Intensity Compensation

In some of the above described embodiments, each frame is divided into a number of sub-frames (N). Each sub-frame contains only part of the picture and is exposed only $1/N^{th}$ of the frame duration. Other embodiments do not necessarily require equal sub-frame exposure. The sum of all sub-frames equals the whole original frame. However, the effective exposure time for the whole frame is only $1/N^{th}$ that of the original frame. In some embodiments, to compensate for this an increased light intensity is employed, for example by using a more powerful lamp. In another embodiment, the intensity of portions of the original picture is modified to compensate for the reduction of exposure time. This is possible because the mind effectively performs an integration over the frame length such that something displayed more brightly for a shorter period of time will be perceived the same as something displayed less brightly for a longer period of time.

Frames collectively will have regions that are relatively bright, and regions that are relatively less bright. For areas that are already bright, it may not be possible to have their intensity adjusted to compensate for the reduction of exposure time since there is a maximum brightness. However, for areas that are less bright, they can have their intensity adjusted to compensate for the reduction in exposure time, since there is "room" to increase the brightness before reaching the maximum brightness. For frames that do not have any dark areas, preferably no sub-framing is applied. Equivalently, a set of identical sub-frames with no omitted portions can be displayed. This is not very common in a typical movie.

Figure 11:
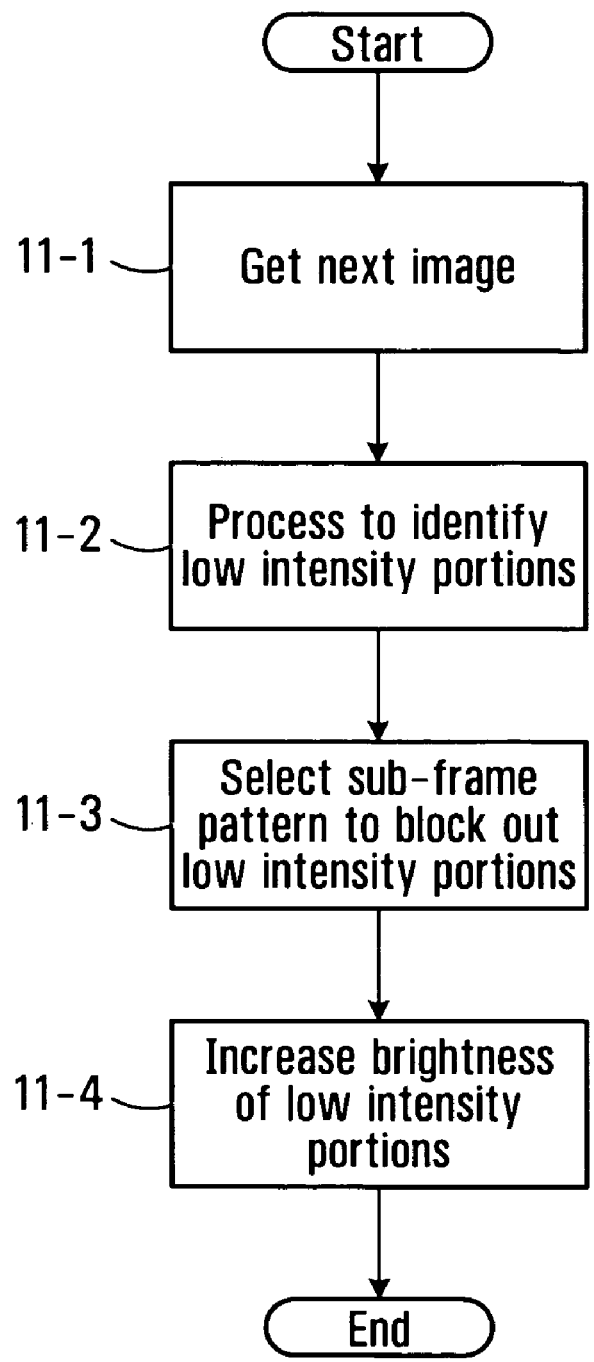
FIG. 11 is a flowchart of a method of performing sub-frame intensity compensation provided by an embodiment of the invention.

FIG. 11 shows a flowchart of a method of compensating for the reduction of exposure time as provided by an embodiment of the invention. In step 11-1, the next image to be processed is obtained. At step 11-2, the image is processed to identify areas that have low intensity, low enough that they can be intensity compensated. This may for example involve identifying portions having a maximum brightness less than some threshold. In some embodiments, assuming that the picture is to be divided into N sub-frames, step 11-2 can be implemented by identifying the regions whose brightness is less than 1/Nth of a maximum brightness. Preferably this is done to a resolution equal to that to be used for sub-frame construction described below. For example, if sub-frame construction involves dividing each frame into a 3×3 array of portions, and selecting a sub-set of these portions for each sub-frame, then preferably, the image processing in step 11-2 is performed on this same 3×3 array of portions to obtain a brightness for each portion and to identify which portions have low intensity. At step 11-3, a sub-frame pattern is then defined in such a manner that it is the portions with low intensity that are selectively removed from some of the sub-frames. At the same time, the brighter portions are included in all the sub-frames produced for that image. Every portion is included in at least one sub-frame. At step 11-4, the intensity compensation is applied such that when the sequence of sub-frames is displayed, an image substantially equivalent to the still image is perceived. For example, this may involve increasing the brightness of each portion that has been removed from one or more sub-frames in at least one of the sub-frame(s) in which it remains to compensate for the portion having being omitted in one or more other sub-frames.

Note that in implementations where maximum brightness is not a factor, the above method can be implemented without consideration to the brightness of the portions being omitted. In other words, portions can be arbitrarily omitted, with appropriate intensity compensation to deal with the shorter exposure time.

Figure 13:
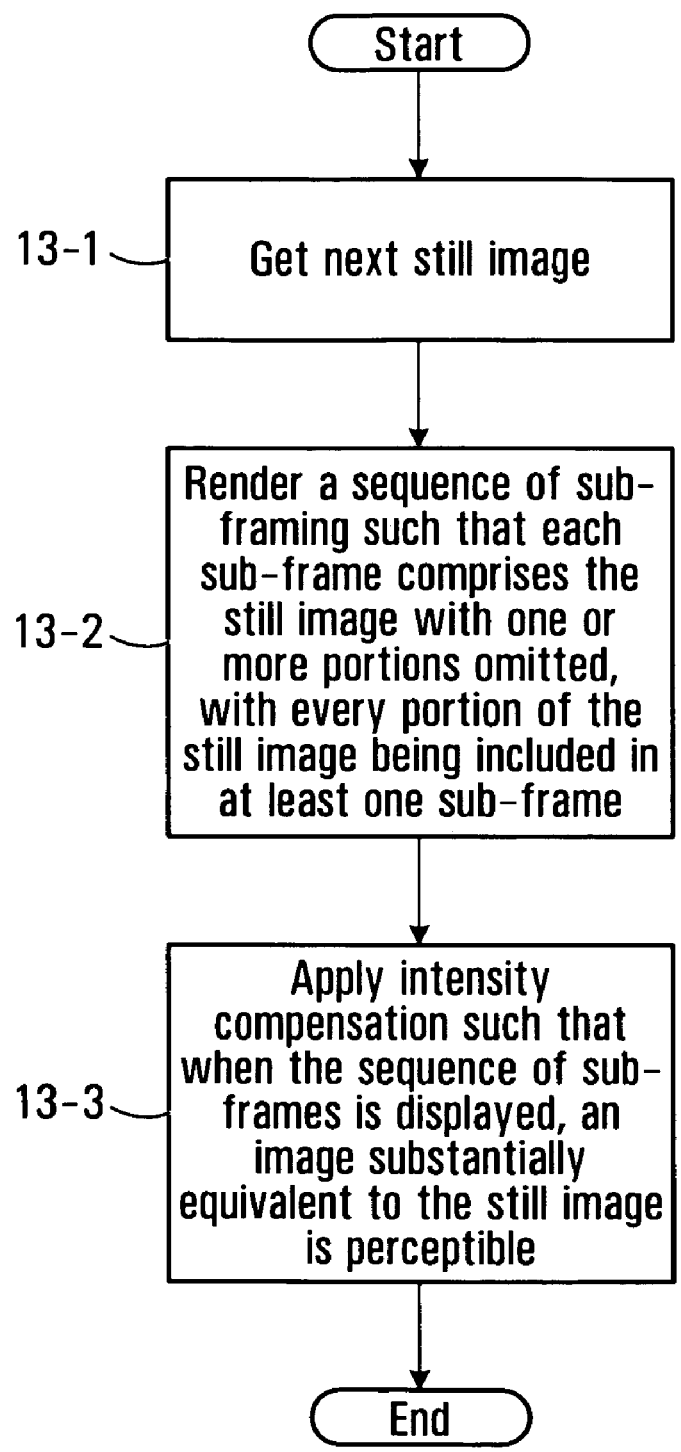
FIG. 13 is a flowchart of another method of performing sub-frame intensity compensation as provided by an embodiment of the invention.

An example of this more general application is shown in the flowchart of FIG. 13. The method involves first getting the next image at step 13-1. At step 13-2, a sequence of sub-frames as rendered such that each sub-frame comprises the still image with one or more portions omitted with every portion of the still image being included in at least one sub-frame. Note that in this case, the portions being omitted may or may not be selected as a function of intensity of the original image. At step 13-3, intensity compensation is then applied such that when the sequence of sub-frames is displayed, an image substantially equivalent to the still image is perceptable. Note that the flowchart shows a particular order of steps, but that the order of steps 13-2 and 13-3 can be reversed, and/or these steps can be combined. For example, the intensity compensation can be applied to areas of the still image that are to be omitted in one or more frames prior to the sub-framing operation.

In some applications image coding is based on the YUV model. Each spot (pixel) is represented by three numbers (Y,U,V). Y stands for the luminance component (the brightness) and U and V are the chrominance (color) components. In one example of how the maximum brightness can be determined for such applications, the maximum brightness within an area is just the maximum value of Y in that area.

More generally, any appropriate method of determining brightness can be employed.

YUV signals are created from an original RGB (red, green and blue) source. The weighted values of R, G and B are added together to produce a single Y signal, representing the overall brightness, or luminance, of that spot. By examining the value of Y, the brightness of that spot can be determined.

In another example, if the coding is based on the RGB model, the relationship between YUV and RGB can be calculated by the following equations and the brightness can be easily determined based on the Y value calculated. Of course, if only Y is needed then U and V need not be determined.

$$Y = 0.299R + 0.587G + 0.114B$$
$$U = 0.492(B - Y)$$
$$= -0.147R - 0.289G + 0.436B$$
$$V = 0.877(R - Y)$$
$$= 0.615R - 0.515G - 0.100B$$

Figure 10:
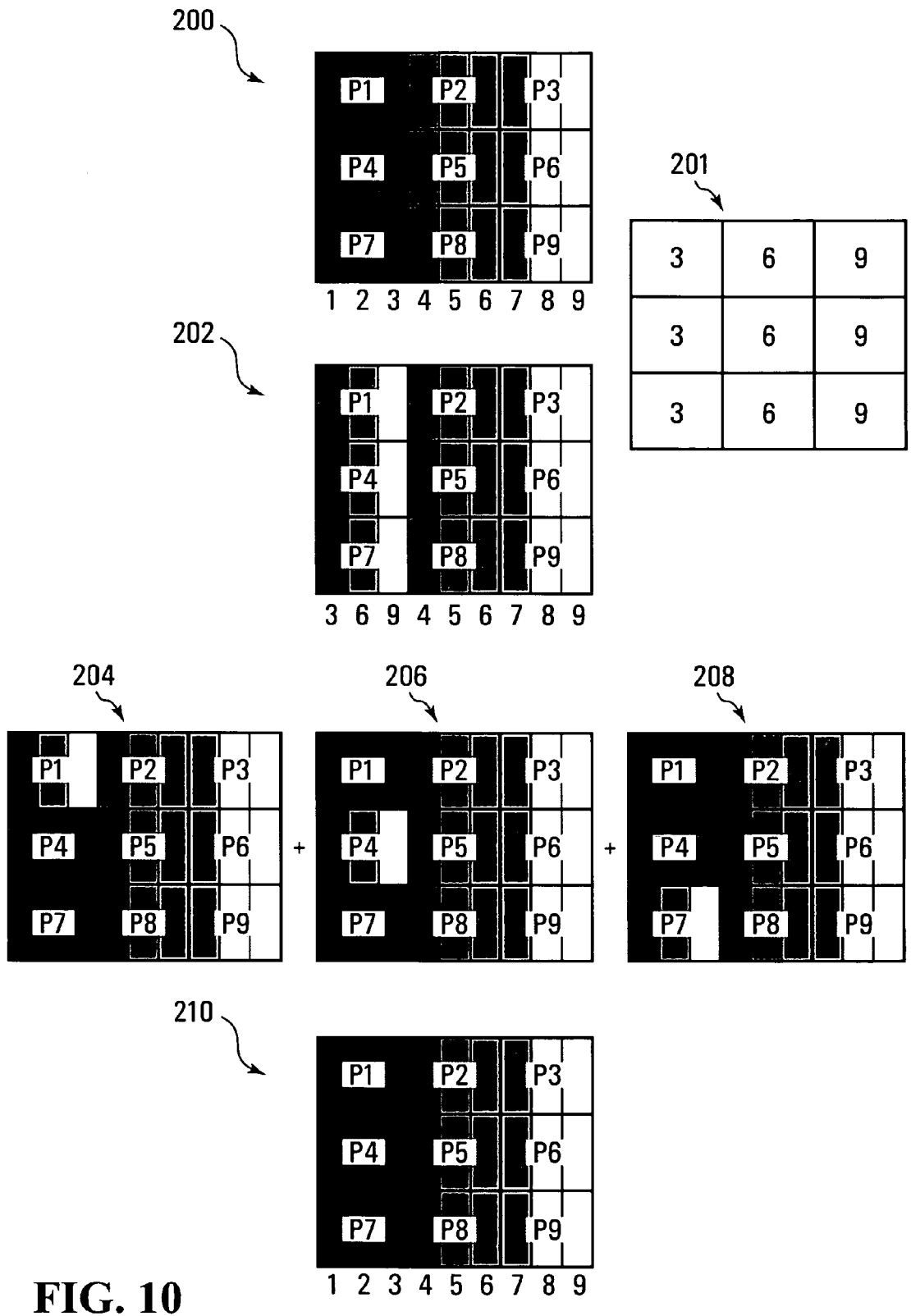
FIG. 10 is an illustration of how sub-frame intensity compensation can be performed for an example image, as provided by an embodiment of the invention.

An example of an application of a very particular instantiation of the method will now be illustrated by way of example with reference to FIG. 10. Generally indicated at 200 is an example of a still image having regions of different brightness for example ranging from 1 to 9 as shown. It is assumed that "9" is also the maximum brightness that can be accommodated. For this example, it is assumed that sub-frame portions are defined in a 3×3 array of portions labeled P1, P2, . . . , P9. The brightness of each sub-frame portion is the maximum brightness within the portion and is indicated in the 3×3 array 201, with the left most column of portions P1, P4, P7 having a maximum brightness of "3", the middle column of portions P2, P5, P8 having a maximum brightness of "6", and the right most column of portions P3, P6, P9 having a maximum brightness of "9". In this case, the three portions P1, P4, P7 having a maximum brightness of "3" are available for sub-frame intensity compensation, since they have a maximum brightness less than or equal to 1/N× maximum brightness=⅓×9=3. A sub-framing pattern is then defined that produces sub-frames that omit one or more of these three portions P1, P4, P7. A three-sub-frame pattern is indicated at 204,206,208 in which sub-frame 204 includes P1, but omits P4 and P7, sub-frame 206 includes P4, but omits P1 and P7, and sub-frame 208 includes P7 but omits P1 and P4. In the sub-frames 204,206,208, any portion that is omitted at least once has its brightness increased to compensate for the decreased exposure time. This is shown having been done in the sub-frames 204,206,208 where portions P1, P4, P7 are shown with three times their original brightness. Equivalently, the original picture can be adjusted prior to sub-framing as shown at 202 where portions P1, P4, P7 are shown with increased brightness.

When the sub-frames 204,206,208 are displayed in sequence, assuming proper selection of the intensity adjustment and exposure times of the sub-frames 204,206,208 the perceived effect will be the same as if the original picture 200 had been exposed for the entire time.

The relationship between the encoded luminance of the picture and the actual desired image brightness is a power-law relationship i.e.

$$I = Y^\gamma$$

where I is the image brightness, Y is the encoded luminance of the picture and γ is the power relationship, with a typical value of γ being about 2.5. γ depends on how the brightness is being coded. To increase the brightness by a factor of N, Y has to be increased by $N^{1/\gamma}$. For example, if N=3, and γ is 2.5 then Y is increased by 1.5518.

Digital Implementations

For digital projectors, the method can be applied in real time, or the processing can be performed off-line. In real-time implementations, the frames are analyzed and the regions of low intensity are mapped in real time, and sub-framing is applied to those regions.

Film Implementations

The approach can also be incorporated in implementations employing film projectors. In film production, typically at some point the video is converted into digital format where special effects are added and videos are edited. The finished video is then converted into film. At the digital stage, the frame can be analyzed and the low intensity region is mapped and its intensity is increased appropriately. The information is stored and used to control the sub-frame generation during projection.

Figure 12A:
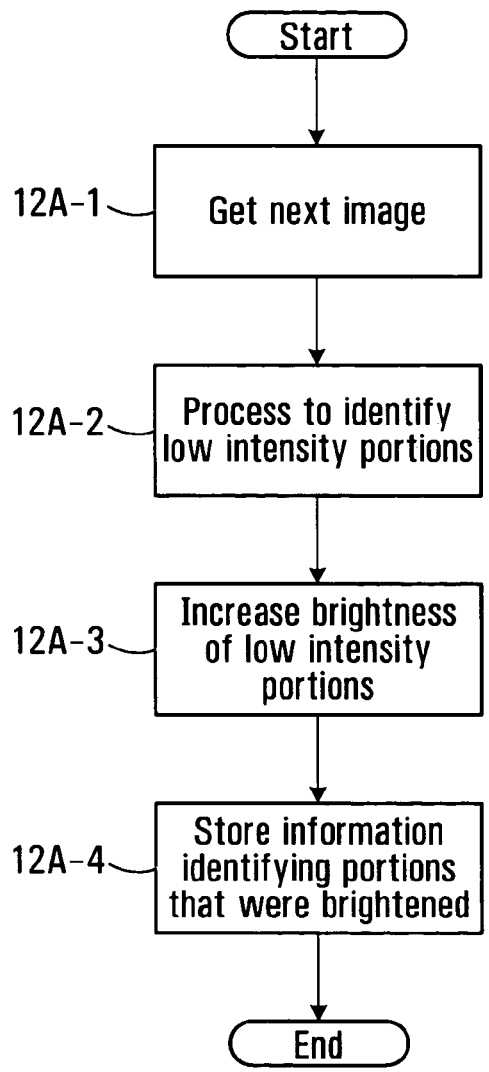
FIGS. 12A and 12B are further flowcharts of another method of performing sub-frame intensity compensation as provided by another embodiment of the invention.
Figure 12B:
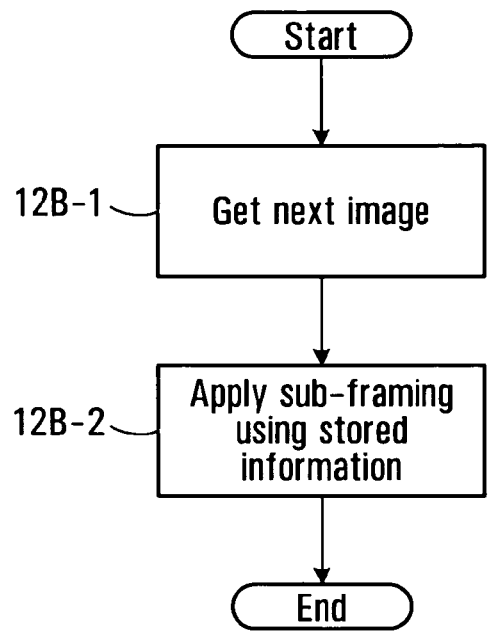

Referring to FIGS. 12A and 12B, flowcharts of method suitable for film implementations are shown, although these methods would also be applicable to digital projectors. The method of FIG. 12A is performed to prepare the film, and the method of FIG. 12B is performed when projecting the film.

Referring first to FIG. 12A, at step 12A-1, the next image is obtained; it is assumed that the images are still available in digital form. At step 12A-2, the image is processed to identify low intensity portions. At step 12A-3, the brightness of the low intensity portions is increased at some point prior to rendering the film version of the image. At step 12A-4, information is stored that identifies the portions of the image that were brightened. For digital projector implementations, this can be stored in the digital video file whereas for analog projector implementations a separate file is required. For the particular example of FIG. 10, the information might be that for image number <image number>, portions P1,P4 and P7 had their brightness increased by a factor of 3.

Referring next to FIG. 12B, at step 12B-1 the next image is obtained. For film projector implementations, this involves the next image being projected by the film projector. While the image is being projected, sub-framing is performed using the previously stored information with the result that for the portions that had their brightness increased, they are exposed for proportionally less time such that an effect equivalent to that of the overall original image is achieved. Any of the display methods described previously can be employed.

In some embodiments, the portions are defined to align with segmentation performed by a compression algorithm. For example, MPEG applies compression on a block-wise basis, and preferably the sub-framing is performed using these same blocks.

Another embodiment of the invention provides a projection system adapted to implement any one of the methods described herein, such as the method of FIG. 11, 12 or 13. For such embodiments, the sub-framing is applied in real time.

Another embodiment of the invention provides a motion picture medium production system adapted to implement any one of the methods described herein. For such embodiments, sub-framing and/or intensity compensation is performed while producing the motion picture medium that is ultimately distributed for projection.

The system of FIG. 6 can also be adapted to implement the intensity compensation methods. The image generator generates a plurality of still images of a motion picture for display during respective image time intervals. The display controller displays, for each of a plurality of still images of a motion picture, a respective sequence of sub-frames such that each sub-frame comprises a respective portion of the still image and such that all portions of the still image are included in at least one sub-frame. Intensity compensation is applied such that each portion of the still image that is not included in all sub-frames is perceptable to have a brightness substantially equivalent to what would have been the case had the portion been included in all sub-frames. This can be done a priori, or during projection.

Further embodiments of the invention provide various motion picture media. Such media include structural features that render them to achieve certain functionality. These can be implemented as film, or as digital media storing digital images.

In one example, a motion picture medium is provided that consists of, for each of a plurality of still images, a respective sequence of sub-frames such that each sub-frame comprises a respective portion of the still image and such that all portions of the still image are included in at least one sub-frame. Intensity compensation is applied to the sub-frames such that each portion of the still image that is not included in all sub-frames is perceptable to have a brightness substantially equivalent to what would have been the case had the portion been included in all sub-frames.

In another example, an intensity compensated sub-framed motion picture medium that has a plurality of still images in which intensity compensation has been performed such that when subsequently a respective sequence of sub-frames is produced and displayed from each still image such that each sub-frame comprises a respective portion of the still image and such that all portions of the still image are included in at least one sub-frame, each portion of the still image that is not included in all sub-frames is perceptable to have a brightness substantially equivalent to what would have been the case had the portion been included in all sub-frames. There is a computer readable medium containing information on how sub-framing is to be performed consistently with how intensity compensation was performed.

In yet another example, an intensity compensated sub-framed motion picture medium is provided that consists of for each of a plurality of still images, a respective sequence of sub-frames such that each sub-frame comprises a respective portion of the still image and such that all portions of the still image are included in at least one sub-frame. There is also a computer readable medium containing information identifying where intensity compensation needs to be performed within the sub-frames such that each portion of the still image that is not included in all sub-frames is perceptable to have a brightness substantially equivalent to what would have been the case had the portion been included in all sub-frames.

Numerous modifications and variations of the present invention are possible in light of the above teachings. It is therefore to be understood that within the scope of the appended claims, the invention may be practiced otherwise than as specifically described herein.

I claim:

1. A method comprising:
    using a computer or a motion picture playback apparatus to perform steps of:
    for each of a plurality of still images of a motion picture:
    processing each still image to determine portions that have a low intensity that is low enough that the portions can be intensity compensated;
    rendering a respective sequence of sub-frames such that each sub-frame comprises the still image with one or more portions omitted, with each portion of the still image being included in at least one sub-frame, wherein the portions that are omitted in rendering the sequence of sub-frames are selected from the portions determined to have low intensity;
    applying intensity compensation such that when the sequence of sub-frames is displayed, an image substantially equivalent to the still image is perceptible.

2. The method of claim 1 wherein processing each still image to determine portions that have a low intensity comprises:
    determining portions that have an intensity less than or equal to 1/N times a maximum intensity, where N is the number of sub-frames in the sequence of sub-frames.

3. The method of claim 1 wherein applying intensity compensation such that when the sequence of sub-frames is displayed, an image substantially equivalent to the still image is perceptible comprises:
    rendering a film with one still image per processed still image in which portions that are to be omitted are brighter on the film;
    storing information identifying the portions of the film that are brighter;
    during projection, applying sub-framing using the stored information.

4. The method of claim 1 wherein rendering and applying intensity compensation comprises:
    storing one digital image per sub-frame;
    increasing intensity of stored pixels that are omitted in at least one sub-frame.

5. The method of claim 4, wherein the respective sequence of sub- frames of the still image comprises N sub-frames, wherein N is a positive integer greater than 1, and wherein each sub-frame is displayed for sub-intervals that is approximately a fraction 1/Nth of an image time interval, and wherein portions that are omitted in all but one sub-frame have their intensity increased by a factor of $N^{1/\gamma}$, where $\gamma$ is a power relationship between an encoded luminance (Y) of the portion and an actual desired image brightness (I) by $I=Y\gamma$.

6. The method of claim 1 wherein applying intensity compensation and rendering comprises:
    storing one digital image per still image in which pixels of the portions to be omitted have increased intensity, and storing information identifying the portions that have increased intensity;
    during projection, applying sub-framing using the stored information.

7. The method of claim 1 wherein processing the image to determine portions that have a low intensity comprises:
    determining a maximum brightness of each of a set of possible portions to be omitted;
    selecting portions having a maximum brightness less than a threshold.

8. The method of claim 7 wherein determining a maximum brightness of each of a set of possible portions to be omitted comprises:
    determining a maximum encoded luminance (Y) value for each of the possible portions to be omitted.

9. The method of claim 8 further comprising computing a luminance (Y) value for each pixel from RGB coding.

10. The method of claim 1 wherein:
    rendering the sub-frames comprises displaying the sub-frames.

11. The method of claim 1 wherein rendering comprises recording.

12. The method of claim 1, further comprising generating each still image in a motion picture projector for projection onto a screen;
    wherein rendering comprises filtering the generated still image to allow the plurality of portions of the generated still image to pass to the screen during respective sub-intervals.

13. The method of claim 1, further comprising:
    projecting each still image onto a mirror;
    wherein rendering comprises reflecting the plurality of portions of the still image from the mirror to a screen during respective sub-intervals.

14. The method of claim 1, wherein rendering comprises illuminating a mirror in a digital motion picture projector.

15. The method of claim 14, wherein displaying comprises:
    providing an LCD (liquid crystal display) covering at least a portion of the mirror; and
    controlling the liquid crystal display to position liquid crystals of the LCD to allow the portions of the generated still image to pass through the LCD during respective sub -intervals.

16. The method of claim 1, wherein rendering comprises filtering each still image to display the plurality of portions of the still image during the respective sub-intervals.

17. A projection system comprising:
    a computer or motion picture playback apparatus configured to implement the method of claim 1.

18. A motion picture medium production system comprising:
    a computer or motion picture playback apparatus configured to implement the method of claim 1.

19. A system comprising:
    an image generator configured to generate a plurality of still images of a motion picture for display during respective image time intervals; and
    a display controller configured to display, for each of a plurality of still images of a motion picture, a respective sequence of sub-frames such that each sub-frame comprises the still image with one or more portions omitted, with each portion of the still image being included in at least one sub-frame, wherein the portions that are omitted in one or more of the sub-frames are selected from portions determined to have low intensity that is low enough that the portions can be intensity compensated;
    wherein there is intensity compensation such that each portion of the still image that is not included in all sub-frames is perceptible to have a brightness substantially equivalent to a brightness of the portion that would have been perceptible had the portion been included in all of the sub-frames of the still image.

20. The system of claim 19, wherein the plurality of sub-frames of each generated still image comprises n sub-frames, and wherein each of the sub-frames is displayed for approximately a fraction 1/nth of the image time interval.

21. The system of claim 19, wherein the image generator comprises a motion picture projector.

22. An article of manufacture comprising:
an intensity compensated sub-framed motion picture medium comprising:
for each of a plurality of still images, a respective sequence of sub-frames stored on the intensity compensated sub-framed motion picture medium such that each sub-frame comprises the still image with one or more portions omitted, with each portion of the still image being included in at least one sub-frame;
wherein the portions that are omitted in one or more sub-frames are selected from portions determined to have low intensity that is low enough that the portions can be intensity compensated, and intensity compensation is applied to the sub-frames such that each portion of the still image that is not included in all sub-frames is perceptible to have a brightness substantially equivalent to a brightness of the portion that would have been perceptible had the portion been included in all of the sub-frames of the still image.

23. An article of manufacture comprising:
an intensity compensated motion picture medium comprising:
a plurality of still images stored on the intensity compensated motion picture medium, in which plurality of still images intensity compensation has been performed such that when subsequently a respective sequence of sub-frames is produced and displayed from each still image such that each sub-frame comprises the still image with one or more portions omitted, with each portion of the still image being included in at least one sub-frame, wherein the portions that are omitted in one or more sub-frames are selected from portions determined to have low intensity that is low enough that the portions can be intensity compensated, each portion of the still image that is not included in all sub-frames is perceptible to have a brightness substantially equivalent to a brightness of the portion that would have been perceptible had the portion been included in all of the sub-frames of the still image; and
a computer readable storage medium containing information on how sub-framing is to be performed consistently with how intensity compensation was performed.

24. The article of manufacture of claim 23 wherein the intensity compensated motion picture medium comprises a film having the plurality of still images stored thereon.

25. The article of manufacture of claim 23 wherein the plurality of still images comprise digital images stored on the computer readable storage medium together with instructions regarding how sub-framing is to be performed.

26. An article of manufacture comprising:
a sub-framed motion picture medium comprising:
for each of a plurality of still images, a respective sequence of sub-frames stored on the sub-framed motion picture medium such that each sub-frame comprises the still image with one or more portions omitted, with each portion of the still image being included in at least one sub-frame, wherein the portions that are omitted in one or more sub-frames are selected from portions determined to have low intensity that is low enough that the portions can be intensity compensated; and
a computer readable storage medium containing instructions identifying where intensity compensation needs to be performed within the sub-frames such that each portion of the still image that is not included in all sub-frames is perceptible to have a brightness substantially equivalent to a brightness of the portion that would have been perceptible had the portion been included in all of the sub-frames of the still image.

27. The article of manufacture of claim 26 wherein the still images are digital images stored on the computer readable storage medium together with the instructions identifying where intensity compensation needs to be performed within the sub-frames.

\* \* \* \* \*